Aug. 12, 1969  A. MIKULS  3,460,800
VALVE WITH ADJUSTABLE STOP AND CLAMP FOR STEM
Filed Aug. 24, 1966  2 Sheets-Sheet 1

INVENTOR:
ANTONS MIKULS
By Keith D. Beecher
ATTORNEY

Aug. 12, 1969          A. MIKULS          3,460,800
VALVE WITH ADJUSTABLE STOP AND CLAMP FOR STEM
Filed Aug. 24, 1966                              2 Sheets-Sheet 2
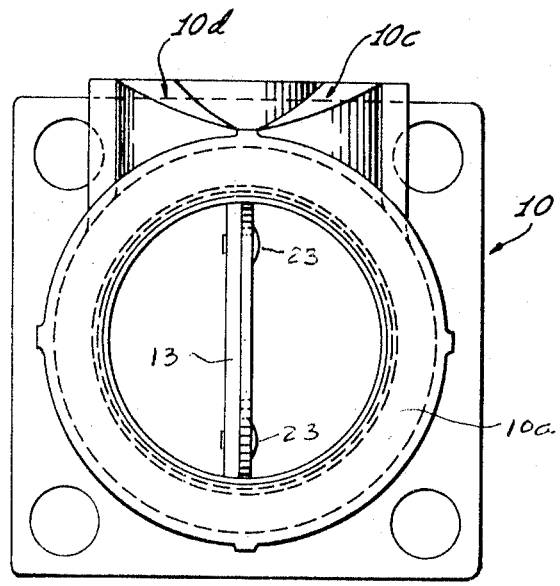
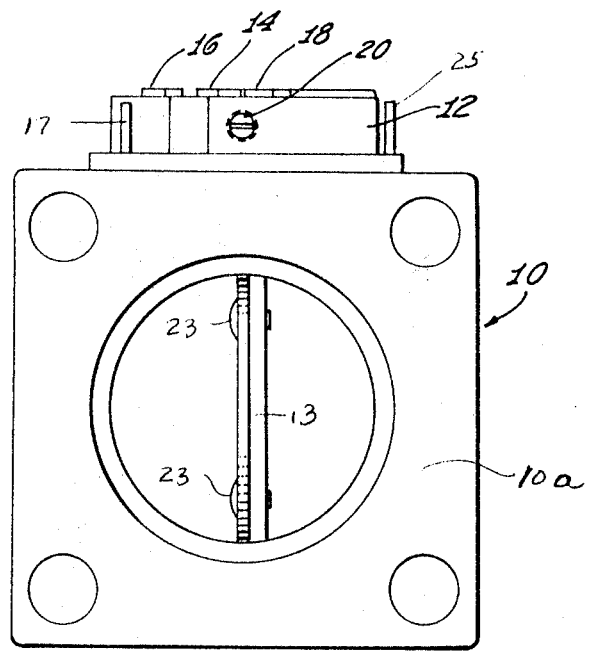
INVENTOR
ANTON MIKULS
By Keith D. Beecher
ATTORNEY United States Patent Office 3,460,800
Patented Aug. 12, 1969

3,460,800
VALVE WITH ADJUSTABLE STOP AND CLAMP FOR STEM
Antons Mikuls, Buffalo, N.Y., assignor to Roberts-Gordon Appliance Corporation, Buffalo, N.Y., a corporation of New York
Filed Aug. 24, 1966, Ser. No. 574,597
Int. Cl. F16k 1/22, 31/60
U.S. Cl. 251—101                                3 Claims

ABSTRACT OF THE DISCLOSURE

An improved valve assembly is provided which incorporates adjustable stops so that the degree of opening and closing of the valve can be adjustably controlled; this being achieved by providing a cam surface on the upper edge of the valve housing, and by providing adjustable screws threaded through the valve handle to depend down from the lower face thereof and to engage the cam surface when the valve handle is turned to its limiting positions.

---

The present invention relates to valves, and it relates more particularly to an improved valve assembly which incorporates adjustable stops whereby the degree of opening and/or the degree of closure of the valve can be adjustably controlled.

The invention finds particular utility in throttle-type of air valve with a disc-type throttle, which are used, for example, in conjunction with fluid fuel burners. However, it will become evident as the description proceeds that the invention has general utility, for example, with a wide variety of plug-type valves for controlling the flow of any fluid.

A principal object of the invention is to provide an improved valve assembly which includes an adjustable stop means for preventing opening of the valve assembly beyond a desired maximum.

A further object of the invention is to provide such an improved valve assembly which alternately or additionally includes an adjustable stop means for preventing closure of the valve beyond a desired minimum.

Yet another object of the invention is to provide such an improved valve assembly which additionally includes means for locking the valve at any desired setting.

It will be appreciated that when the valve assembly of the present invention is used as a throttle valve, for example, to control the air supplied to a fluid fuel burner, the aforesaid adjustable stop means permits the valve to be adjusted easily within the normal fuel/air mixture range of the burner, and prevents the valve from being inadvertently adjusted beyond that range.

In carrying out the concepts of the invention in the embodiment to be described, a cam surface is provided on the upper edge of the valve housing, and a screw is threaded through the valve handle so as to depend down from the lower face thereof in the proximity of the aforesaid cam surface.

As will be described, adjustment of the aforementioned screw determines how far the valve handle can be turned, for example, to open the valve, before the lower tip of the screw engages the cam surface and acts as a stop to prevent any further opening of the valve.

Likewise, and as will also be described, a further screw may be provided which cooperates with a further cam surface in the same manner so as to limit the extent to which the valve can be closed.

An additional set screw may also be threaded through the valve handle, and this additional screw can be tightened down against the upper edge of the valve housing to lock the valve to any desired setting.

Features of the invention include the adjustability and simplicity of the combination. Moreover, as will become more evident as the description proceeds, the valve assembly of the invention may be constructed easily and inexpensively. For example, the valve assembly can be cast, and little machining is necessary.

Other features, objects and advantages of the invention will become evident from the following description, in which:

FIGURE 3 is an end view, essentially on the line 3—3 of FIGURE 1; and

FIGURE 4 is an end view, essentially on the line 4—4 of FIGURE 1.

Figure 1:
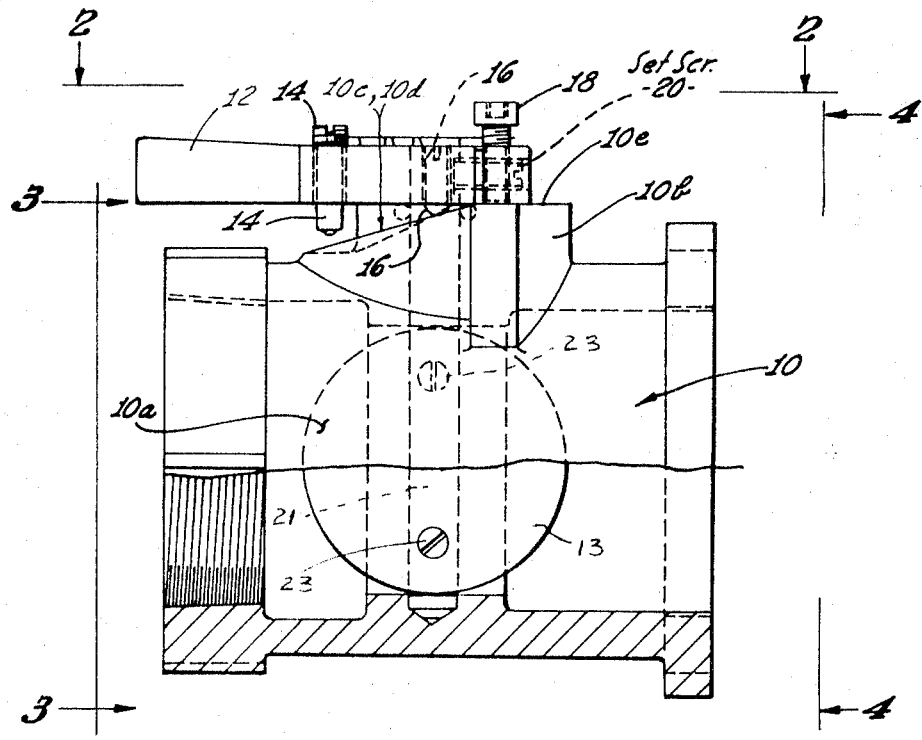
FIGURE 1 is a side view, partly in section, of one embodiment of the valve assembly.
Figure 2:
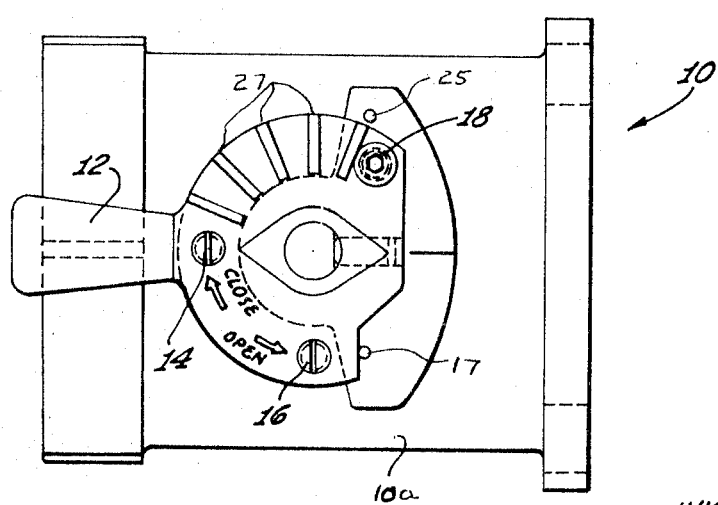
FIGURE 2 is a plan view of the assembly of FIGURE 1, taken along the line 2—2.

As illustrated in the drawing, the valve assembly includes a housing 10. This housing may be formed of any configuration appropriate to the intended use of the particular valve. The particular housing shown in the drawing is appropriate for a usual throttle-type air valve.

As mentioned above, the housing 10 may be appropriately cast, and it includes a tubular portion 10a adapted to be coupled into the line which is to be controlled. The housing 10 includes a further integral tubular portion 10b, the latter tubular portion being coaxial with an axis which transverses the axis of the tubular portion 10a. The ends of the tubular portion 10a may be threaded or flanged as required.

The tubular portion 10b is intended to receive a control handle such as the handle 12. The handle 12 is mounted over the top edge of the tubular portion 10b, and it serves to control the inner butterfly throttle member 13, or other plate or plug-type throttle component of the valve assembly. The handle 12 may be manually controlled, or it may be coupled to an automatic control mechanism.

The upper endge of the tubular portion 10b is formed, in the particular embodiment, to include a pair of cammed surfaces 10c and 10d. The upper edge is also formed to include a further surface 10e, the latter surface lying generally in the plane of the upper edge normal to the axis of the tubular portion 10b.

A first pair of set screws 14 and 16 are threaded through the handle 12, and the lower ends of these set screws depend down from the lower face of the handle in proximity with the respective cammed surfaces 10c and 10d. The set screw 14 is a range limiting adjustment screw in the closing direction; and the set screw 16 is a range limiting adjustment screw in the opening direction.

It will be appreciated that the set screws 14 and 16 may be individually adjusted, so that their lower ends protrude more or less from the lower face of the handle 12.

The setting of the screws 14 and 16 is dictated by the point at which the lower end of the screw engages the respective cammed surfaces 10c and 10d. This, in turn, controls the amount of closure or opening of the valve itself. Therefore, the screws 14 and 16 serve as adjustable stop means, controlling the amount whereby the valve may be opened or closed. A fixed stop 17 is also provided for a maximum setting in the opening direction.

In addition, a locking screw 18 may be provided. The locking screw 18 is also threaded through the control handle, and it moves in an arc across the surface 10e, as the valve is opened or closed. The valve may be locked in any desired position, merely by tightening the locking screw 18 down on the surface 10e. A set screw 20 locks the handle 12 to the operating shaft 21 of the valve. The throttle member 13 is affixed to the shaft 21, as by screws 23, as shown. A seal may be provided between the shaft and the bore of the tubular portion 10b when the valve is used to control the flow of gaseous fuel, or other gas.

A position indicator 25 is provided on the surface 10e. This indicator, in conjunction with a scale 27 on the handle 12, shows the position of the valve for any adjustment.

The assembly described above provides an exceedingly simple, yet most effective stop means for the valve assembly. In addition to its simplicity, the valve means is most advantageous, in that it may be easily and conveniently adjusted, so as to control precisely the limiting amount of opening or closure of the valve assembly.

Moreover, the provision of the lock screw 18 permits the valve assembly to be locked at any angular position of the handle.

What is claimed is:

1. A valve assembly including: a valve housing having a tubular portion, said tubular portion having an upper edge with a first surface lying generally in a plane perpendicular to the axis of said tubular portion and with at least one cammed surface formed thereon extending angularly about said tubular portion from said first surface in a first direction and inclined downwardly from said plane; a control handle for said valve assembly mounted for rotation on said upper edge of said tubular portion about the aforesaid axis thereof and extending out over said inclined cammed surface and spaced up therefrom; and an adjustable set screw threaded through said handle and having an end portion protruding down into proximity with said cammed surface to engage said cammed surface when said handle is turned about the aforesaid axis to a particular angular position with respect to said tubular portion and thereby limit the turning range of said handle.

2. The valve assembly defined in claim 1, in which the upper edge of said tubular portion includes a second cammed surface thereon extending angularly from said first surface around said tubular portion in a direction opposite to said first mentioned cammed surface and inclined downwardly from said plane, and which includes a second adjustable set screw threaded through said handle and having an end portion protruding down into proximity with said second cammed surface as said handle is turned about said axis to a position over said second cammed surface so as to engage said second cammed surface when said handle is turned to a particular angular position with respect to said tubular portion so as to serve as a second limit on the turning range of said handle.

3. The valve assembly defined in claim 1, and which includes a stop screw threaded through said handle in position to engage said first surface of said upper edge of said housing so as to lock said handle at any particular angular position with respect to said tubular portion.

References Cited

UNITED STATES PATENTS

| 955,979 | 4/1910 | Murphy | 251—288 |
| 1,161,861 | 11/1915 | Hodges | 251—288 X |
| 2,443,036 | 6/1948 | Hopkins | 251—285 X |
| 3,355,141 | 11/1967 | Cooper | 251—101 |
| 99,082 | 1/1870 | Hammond | 251—90 |
| 1,398,888 | 11/1921 | Cadigan | 251—90 |

FOREIGN PATENTS

| 1,834 | 7/1865 | Great Britain. |
| 329,240 | 5/1930 | Great Britain. |

ROBERT W. MICHELL, Primary Examiner

LEON G. MACHLIN, Assistant Examiner

U.S. Cl. X.R.

251—285, 288